US008992065B2

(12) United States Patent
Oh

(10) Patent No.: US 8,992,065 B2
(45) Date of Patent: Mar. 31, 2015

(54) DETACHABLE LIGHT EMITTING DEVICE USING LIGHT EMITTING DIODE MODULES

(76) Inventor: Wan Ho Oh, Daejeon (KR)

( * ) Notice: Subject to any disclaimer, the term of this patent is extended or adjusted under 35 U.S.C. 154(b) by 0 days.

(21) Appl. No.: 13/704,750

(22) PCT Filed: Jun. 15, 2011

(86) PCT No.: PCT/KR2011/004373
§ 371 (c)(1),
(2), (4) Date: Dec. 17, 2012

(87) PCT Pub. No.: WO2011/159097
PCT Pub. Date: Dec. 22, 2011

(65) Prior Publication Data
US 2013/0083559 A1    Apr. 4, 2013

(30) Foreign Application Priority Data
Jun. 16, 2010  (KR) .................... 10-2010-0056965

(51) Int. Cl.
*F21V 8/00*   (2006.01)
*G09F 13/18*  (2006.01)
*G09F 13/04*  (2006.01)
*G09F 13/22*  (2006.01)

(52) U.S. Cl.
CPC ............ *G02B 6/0011* (2013.01); *G02B 6/0088* (2013.01); *G02B 6/009* (2013.01); *G09F 13/18* (2013.01); *G02B 6/0068* (2013.01); *G02B 6/0073* (2013.01); *G09F 2013/0459* (2013.01); *G09F 2013/049* (2013.01); *G09F 2013/1831* (2013.01); *G09F 2013/1836* (2013.01); *G09F 2013/1872* (2013.01); *G09F 2013/222* (2013.01)
USPC ........................................................ 362/612

(58) Field of Classification Search
USPC ....................................... 362/612, 249.02, 235
See application file for complete search history.

(56) References Cited

U.S. PATENT DOCUMENTS

2010/0079697 A1    4/2010   Park et al.

FOREIGN PATENT DOCUMENTS

| JP | 2004271734 A | 9/2004 |
| KR | 1020070048150 A | 5/2007 |
| KR | 2020080005835 U | 12/2008 |

*Primary Examiner* — Tracie Y Green
(74) *Attorney, Agent, or Firm* — Revolution IP, PLLC

(57) ABSTRACT

Disclosed is a detachable light emitting device. The device comprises a body casing in which a front frame is mounted on the front thereof, and at least one of a plurality of detachable parts that are installed on an upper side or a lower side of the body casing; radiation stands are vertically disposed on both left and right sides inside the body casing, and front cutting grooves; light guide plate stands are vertically inserted and coupled in the front cutting grooves of each of the radiation stands, respectively, and side mounting grooves are formed on each one side thereof. LED module mounting stands are vertically inserted and coupled in the side mounting grooves of each of the light guide plate stands, respectively, and LED mounting grooves are vertically formed on each one side thereof.

16 Claims, 9 Drawing Sheets

DETACHABLE LIGHT EMITTING DEVICE USING LIGHT EMITTING DIODE MODULES

CROSS-REFERENCE TO RELATED APPLICATION

This application claims the benefit of Korean Patent Application No. 10-2010-0056965, filed on Jun. 16, 2010 in the Korean Intellectual Property Office, the disclosure of which is incorporated herein by reference.

TECHNICAL FIELD

The present invention relates to a detachable light emitting device using light emitting diode modules which enhances light-emitting efficiency of a light emitting diode (LED) module, and is easy to be attachable to and detachable from the LED module, and thus can make a replacement, repairs and maintenance be easily performed, and more particularly, to a detachable light emitting device using light emitting diode modules which includes a body casing having an open front surface, formed in a case shape having a vacant inside and vertically erected, and comprising a front frame mounted on a front side of the body casing and one or a plurality of detachable parts that is or are installed on an upper side or a lower side of the body casing, radiation stands vertically erected respectively on both left and right sides of inside the body casing to be assembled, and respectively comprising a front cutting groove vertically formed in a front side of the radiation stand, light guide plate stands vertically inserted into and coupled in the front cutting grooves of each of the radiation stands respectively, and comprising side mounting grooves formed on each one side of the light guide plate stand, LED module mounting stands vertically inserted into and coupled in the side mounting groove of each of the light guide plate stands respectively, and respectively comprising a LED mounting groove vertically formed on each one side of the LED module mounting stand, LED modules respectively comprising printed circuit board that is vertically inserted into and coupled in the LED mounting groove of each of the LED module mounting stands and has a length corresponding to a length of the LED module mounting stand, a plurality of LEDs being disposed on one side of the printed circuit board at a certain interval, a light guide plate vertically erected to be mounted between the left and right light guide plate stands when the LED module mounting stands and the LED modules are being respectively inserted into and coupled in each of the light guide plate stands and outputting surface light emitted by LEDs, the LEDs mounted on the LED modules being adjacent to a left and right side of the light guide plates, and a front plate formed in a plate shape, installed on the front side of inside the body casing, and outputting light transferred from the light guide plate, various characters, drawings, photos or the like being printed on the front plate.

BACKGROUND ART

Generally, a light emitting device using light emitting diodes is widely used in a variety of fields, such as a billboard, a traffic light, a bus direction board, or the like, and includes a printed circuit board formed in a certain plate shape, a plurality of diodes closely disposed in a entirety of a front surface of the printed circuit board and connecting to each other with a circuit and a control unit controlling to light the light emitting diodes to display various letters, figures or the like. However, because the light emitting means includes a plurality of light emitting diodes closely disposed in the printed circuit board, the light emitting means has large power consumption, and thus, a cost of manufacturing and maintaining the light emitting means increases. Also, because of high heat occurring in the diodes, a life of the light emitting diode is shortened, and thus, a malfunction occurs frequently. Moreover, the light emitting means displays letters or figures using a type of dot emitting when the light emitting diodes are being closely disposed in the printed circuit board, and thus, when the light emitting means is applied to a traffic light, light emitted from diodes directly irradiates and blinds a driver to cause a car accident. However, if the number of the diodes disposed in the traffic light decreases so at to prevent a driver from being blinded by the light, a cognitive power greatly decreases.

To remove the limitation, a related art light emitting device including a light guide plate, a LED module, a front plate, and a body casing is provided. The light guide plate is formed of a transparent material and a plate shape, and a plurality of irradiating lines formed in a horizontal and vertical direction are formed in a back side of the light guide plate. The LED module includes a printed circuit board formed in a long bar shape a length of which corresponds to a length of the side of the light guide plate, and a plurality of diodes disposed in other side of the printed circuit board at a certain interval. Here, the diodes are disposed to be adjacent to one side or both sides of the light guide plate, and light emitted from the LED moves along to the irradiating lines for the light guide plate to output plane light. The front plate is formed in a plate shape, is installed on the front side of the light guide plate, and outputs light transferred from the light guide plate. Also, various characters, photos, drawings, or the like are printed on the front plate. The light guide plate in which the LED module is installed, and the front plate are built in the body casing. The related art light emitting device outputs plane light through the light guide with a small number of LEDs to decrease power consumption, and enhances visibility of letters, photos, drawing or the like.

However, in the related art light emitting device, to install the LED module in a side surface of the light guide, a worker has to wrap the LED module together with the side surface of the light guide plate using an aluminum tape or an insulating tape to tightly contact the LED module and the light guide plate when the LED module formed in a thin and long bar shape is being tightly contacted the side surface of the light guide plate by hand of a worker. Therefore, an installing work is very difficult and needs many times. Also, when the LED module is attached to the light guide plate with the aluminum tape or the like, many cases where the side surface of the light guide plate does not exactly face the LED module, and is dislocated with the LED module occur, and thus, light-emitting efficiency decrease. Moreover, if the LED module formed in a long bar shape is used for a long time, the LED module is transformed by heat generated in the LED module to be dislocated to be separated from the side surface of the light guide plate. Therefore, light emitted from the LED in the LED module is not efficiently transferred to the light guide plate, and radiation of heat is not performed efficiently in the LED module, and thus, a plurality of LEDs are damaged in a short time.

Moreover, when the LED module is damaged or broken to be replaced or repaired, the LED module has to be separated by removing the aluminum tape after the light guide plate in which the LED module is installed, the front plate, or the like are taken out of the inside of the body casing, and then, a new LED module has to be installed. Therefore, it is difficult to replace and repair the LED module and many time are need.

In Korean Utility Model Registration No. 20-0396887 as a related art, an advertisement plate, which includes a frame having an open front side and formed in a shape where both sides of an upper portion and a lower portion are bent, a plurality of light emitting diodes disposed along a length direction of the frame, a block frame installed in the frame, and a plurality of advertising blocks slid and assembled to be inserted into the block frame, is disclosed. In the advertisement plate, both ends of the frame are covered with a stopper and a bolt is coupled when the block frames are being inserted into the frame in a row. Therefore, it is inconvenient and complicated to couple the advertisement plate with the stopper, the bolt, or the like. Also, there is not a light guide plate in which an irradiating line is cut. Moreover, a plurality of an advertisement block, in which an advertising copy is formed using a type of intaglio, configures one advertising letter. Therefore, to form a different advertising letter, an existing advertisement block has to be removed, and a new advertising letter has to be reinstalled with advertisement blocks in each of which a new advertising copy is formed using a type of intaglio. Therefore, an overall process of installing and assembling the advertisement plate is complicated and a cost of replacing the advertisement block greatly increases.

DISCLOSURE OF INVENTION

Accordingly, the present invention is directed to provide a detachable light emitting device using light emitting diode modules, which substantially obviates one or more problems due to limitations and disadvantages of the related art. An aspect of the present invention is directed to provide a detachable light emitting device using light emitting diode modules, which includes radiation stands vertically erected respectively on both left and right sides of inside the body casing to be assembled, light guide plate stand and LED module mounting stand sequentially and vertically inserted into and coupled in the inside of the radiation stand, a LED module vertically inserted to be coupled to the LED module mounting stand to be simply and stably mounted on the LED module mounting stand, a light guide plate closely contacting the LED module disposed to be adjacent to the light guide plate so as to enhances light-emitting efficiency, a LED module mounting stand, a light guide plate stand and the radiation stand sequentially surrounding and fixing the outside of the LED module such that heat generated from the LED module naturally radiates to the outside of the LED module for the LED module not to be transformed to be dislocated to be separated from the side surface of the light guide plate when the LED module is used for long times, and one or a plurality of detachable parts disposed in a top surface or a bottom surface of the body casing through which the each of the LED module, the LED module stand and the light guide stand can be attached or detached in an up-and-down direction depending on the elements configuring the device and assembled using a inserting-and-coupling method by making total structures with a inserting and coupling method, such that a replace and a repair can be easily performed.

To achieve these and other advantage and in accordance with the purpose of the invention, as embodied and broadly described herein, there is provided a detachable light emitting device using light emitting diode modules, which includes: a body casing having an open front surface, formed in a case shape having a vacant inside and vertically erected, and comprising a front frame mounted on a front side of the body casing and one or a plurality of detachable parts that is or are installed on an upper side or a lower side of the body casing; radiation stands vertically erected respectively on both left and right sides of inside the body casing to be assembled, and respectively comprising a front cutting groove vertically formed in a front side of the radiation stand; light guide plate stands vertically inserted into and coupled in the front cutting grooves of each of the radiation stands respectively, and comprising side mounting grooves formed on one side of each of the light guide plate stands; LED module mounting stands vertically inserted into and coupled in the side mounting groove of each of the light guide plate stands respectively, and respectively comprising a LED mounting groove formed in a vertical direction on each one side of the LED module mounting stand; LED modules respectively comprising printed circuit board that is vertically inserted into and coupled in the LED mounting groove of each of the LED module mounting stands and has a length corresponding to a length of the LED module mounting stand, a plurality of LEDs being disposed on one side of the printed circuit board at a certain interval; a light guide plate vertically erected to be mounted between the left and right light guide plate stands when the LED module mounting stands and the LED modules are being respectively inserted into and coupled in each of the light guide plate stands, and outputting surface light emitted by LEDs, the LEDs mounted on the LED modules being adjacent to a left and right side of the light guide plates; and a front plate formed in a plate shape, installed on the front side of inside the body casing, and outputting light transferred from the light guide plate, various characters, drawings or photos being printed on the front plate.

ADVANTAGEOUS EFFECTS

According to the embodiments of the present invention, because the detachable light emitting device using light emitting diode modules includes radiation stands vertically erected respectively on both left and right sides of inside the body casing to be assembled, light guide plate stand and LED module mounting stand sequentially and vertically inserted into and coupled in the inside of the radiation stand, a LED module vertically inserted to be coupled to the LED module mounting stand to be simply and stably mounted on the LED module mounting stand, and a light guide plate closely contacting the LED module disposed to be adjacent to the light guide plate, light-emitting efficiency can be enhanced. Also, because the detachable light emitting device using light emitting diode modules includes a LED module mounting stand, a light guide plate stand and the radiation stand sequentially surround and fix the outside of the LED module such that heat generated from the LED module naturally radiates to the outside of the LED module for the LED module not to be transformed to be dislocated to be separated from the side surface of the light guide plate when the LED module is used for long times, light-emitting efficiency is excellent. Moreover, because the detachable light emitting device using light emitting diode modules includes one or a plurality of detachable parts disposed in a top surface or a bottom surface of the body casing through which the each of the LED module, the LED module stand and the light guide stand can be attached or detached in an up-and-down direction depending on the elements configuring the device and assembled using a inserting-and-coupling method, a replace and a repair can be easily performed.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

Figure 1:
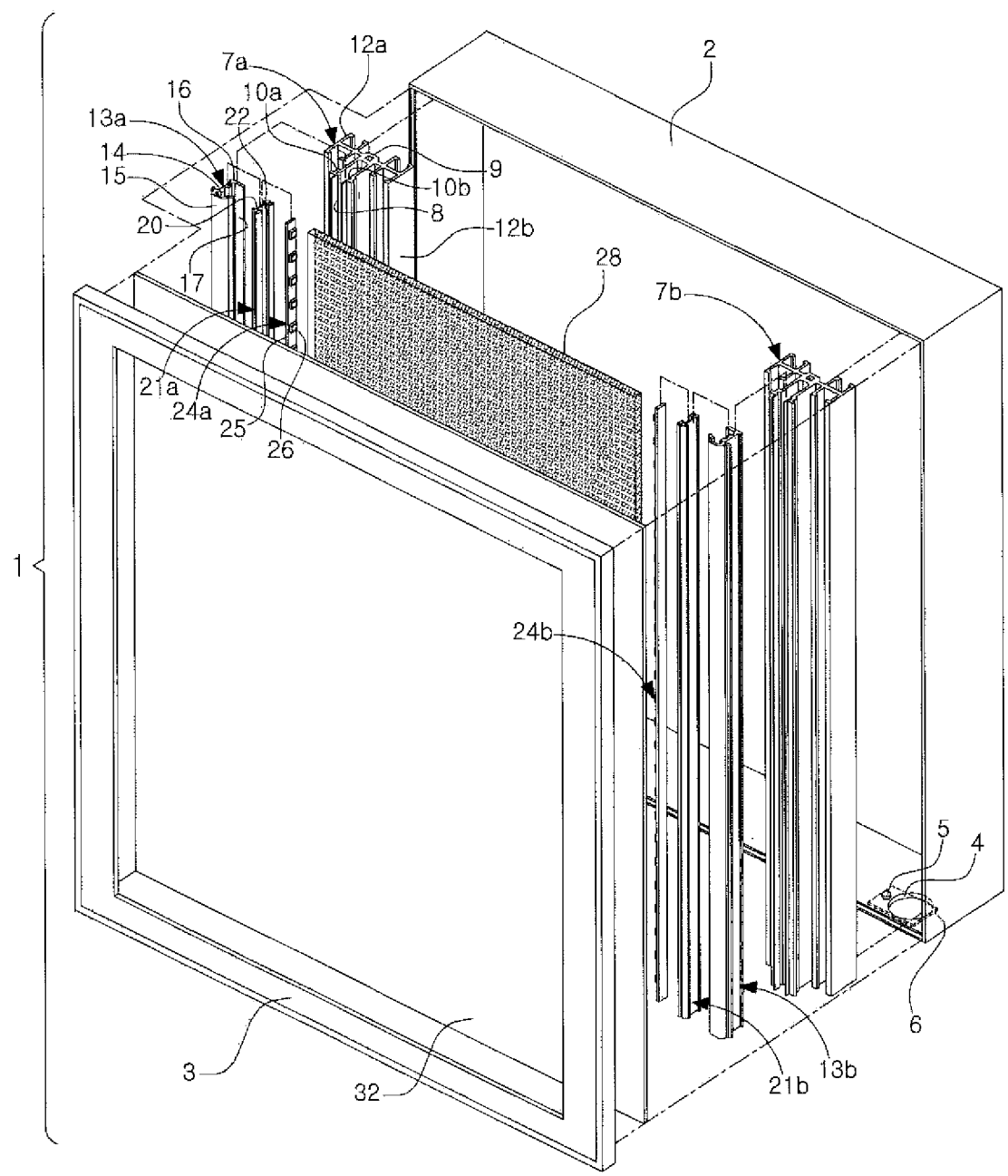
FIG. 1 is an exploded perspective view schematically illustrating a detachable light emitting device using light emitting diode modules according to an embodiment of the present invention.

| Descriptions of reference numbers | |
|---|---|
| 1. detachable light emitting device | 2. body casing |
| 3. front frame | 4. detachable part |
| 5. rotation shaft | 6. opening and closing door |
| 7a, 7b. radiation stand | 8. front cutting grooves |
| 9. radiation stand body | 10a, 10b. inserting groove |
| 11a, 11b. front protrusion | 12a, 12b. radiation bar |
| 13a, 13b. light guide plate stand | 14. light guide plate stand body |
| 15. front mounting bar | 16. rear mounting bar |
| 17, 17'. side mounting groove | 18a, 18b. frond end protrusion |
| 19, 19'. guide rail | 20, 20'. guide recess |
| 21a, 21b, LED module mounting stand | 22. LED mounting groove |
| 23a, 23b. wire inserting groove | 24a, 24b. LED module |
| 25. printed circuit board | 26. LED |
| 27a, 27b. wire | 28. light guide plate |
| 29. irradiating line | 30. rear plate |
| 31. reflecting film | 32. front plate |
| 33. middle radiation stand | 34. middle light guide stand |
| 35, 35'. middle LED module mounting stand | 36, 36'. middle LED module |

MODES FOR CARRYING OUT THE INVENTION

Reference will now be made in detail to the exemplary embodiments of the present invention, examples of which are illustrated in the accompanying drawings. Wherever possible, the same reference numbers will be used throughout the drawings to refer to the same or like parts. Hereinafter, embodiments of the present invention will be described in detail with reference to the accompanying drawings.

The detachable light emitting device 1 using light emitting diode modules according to the present invention, as shown in FIGS. 1 to 9, includes a light guide plate 28 outputting plane light so as to increase light-emitting efficiency, and a LED modules 24a and 24b each of which is formed in a bar shape, and inserted and coupled to be assembled in one side surface or both side surface of the light guide plate 28 when the LED modules are being closely contacting the light guide plate 28, and thus, each of the LED modules 24a and 24b can be easily attached or detached, whereupon a replacement, a repair and a management can be easily performed. Moreover, the detachable light emitting device includes a body casing 2 having an open front surface, formed in a case shape having a vacant inside and vertically erected, and comprising a front frame 3 mounted on a front side of the body casing 2 and one or a plurality of detachable parts 4 that is or are installed on an upper side or a lower side of the body casing 2, radiation stands 7a and 7b vertically erected respectively on both left and right sides of inside the body casing 2 to be assembled, and respectively comprising a front cutting groove 8 vertically formed in a front side of the radiation stand, light guide plate stands 13a and 13b vertically inserted into and coupled in the front cutting grooves 8 of each of the radiation stands 7a and 7b respectively, and comprising side mounting grooves 17 formed on each one side of the light guide plate stand, LED module mounting stands 21 and 21b vertically inserted into and coupled in the side mounting groove 17 of each of the light guide plate stands 13a and 13b respectively, and respectively comprising a LED mounting groove 22 vertically formed on each one side of the LED module mounting stand 21a and 21b, LED modules 24a and 24b respectively comprising printed circuit board 25 that is vertically inserted into and coupled in the LED mounting groove 22 of each of the LED module mounting stands 21a and 21b and has a length corresponding to a length of the LED module mounting stand, a plurality of LEDs 26 being disposed on one side of the printed circuit board 25 at a certain interval, a light guide plate 28 vertically erected to be mounted between the left and right light guide plate stands 13a and 13b when the LED module mounting stands 21a and 21b and the LED modules 24a and 24b are being respectively inserted into and coupled in each of the light guide plate stands 13a and 13b and outputting surface light emitted by LEDs 26, the LEDs 26 mounted on the LED modules 24a and 24b being adjacent to a left and right side of the light guide plate 28, and a front plate 32 formed in a plate shape, installed on the front side of inside the body casing 2, and outputting light transferred from the light guide plate 28, various characters, drawings, photos or the like being printed on the front plate 32.

The body casing 2, as shown in FIGS. 1 and 3 to 6, is formed in a shape of a case. Here, a front surface of the case is open, an inside of the case is vacant, and the case is vertically erected. The radiation stands 7a and 7b vertically erected are respectively inserted into each of a left side and a right side of a rear direction of an inside of the body casing 2 at a certain interval to be coupled to the body casing 2. The light guide plate stands 13a and 13b each of which is respectively inserted to be coupled to the radiation stand 7a and 7b, and the LED module mounting stands 21a and 21b and the LED modules 24a and 24b each of which is respectively inserted to be coupled to the light guide plate stand 13a and 13b are disposed in a front direction of the inside of the body casing 2. The light guide plate 28 is inserted to be coupled between the light guide plate stands 13a and 13b to be disposed in a central portion of the front direction of the inside of the body casing 2. The front plate 32 is vertically erected to be disposed in the open front surface of the body casing 2. The front plate 32 is fixed by a front frame 3 which can be attached to or detached from the front surface of the body casing 2 and is formed in a general frame shape, and thus, a replacement of the front plate 32 can be easily performed depending on attaching or detaching the front frame 3.

Figure 5:
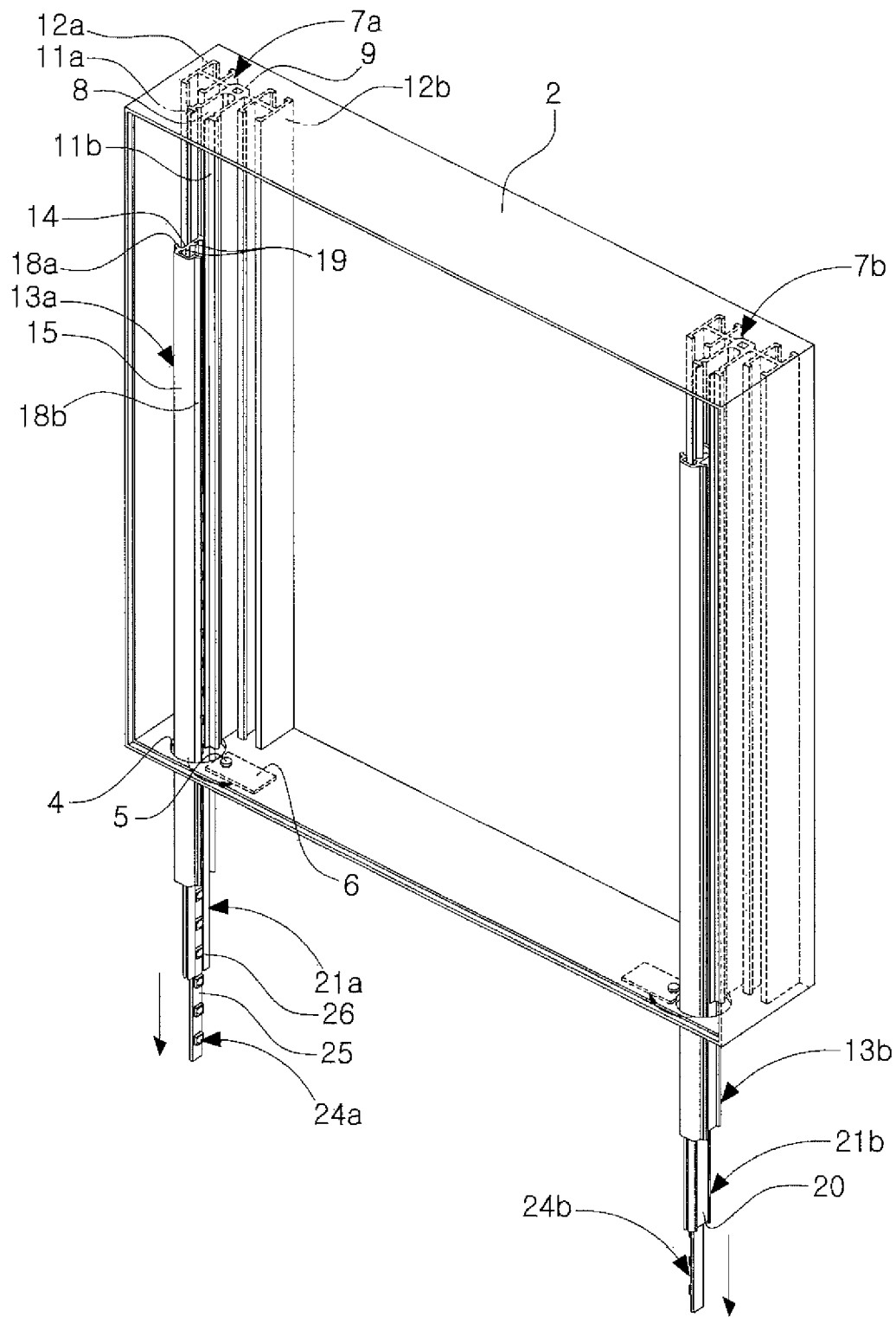
FIG. 5 is a perspective view schematically illustrating a state where a light guide stand, a LED module mounting stand and a LED module are being attached to or detached from a radiation stand assembled and installed inside a body casing of the detachable light emitting device according to the present invention.
Figure 6:
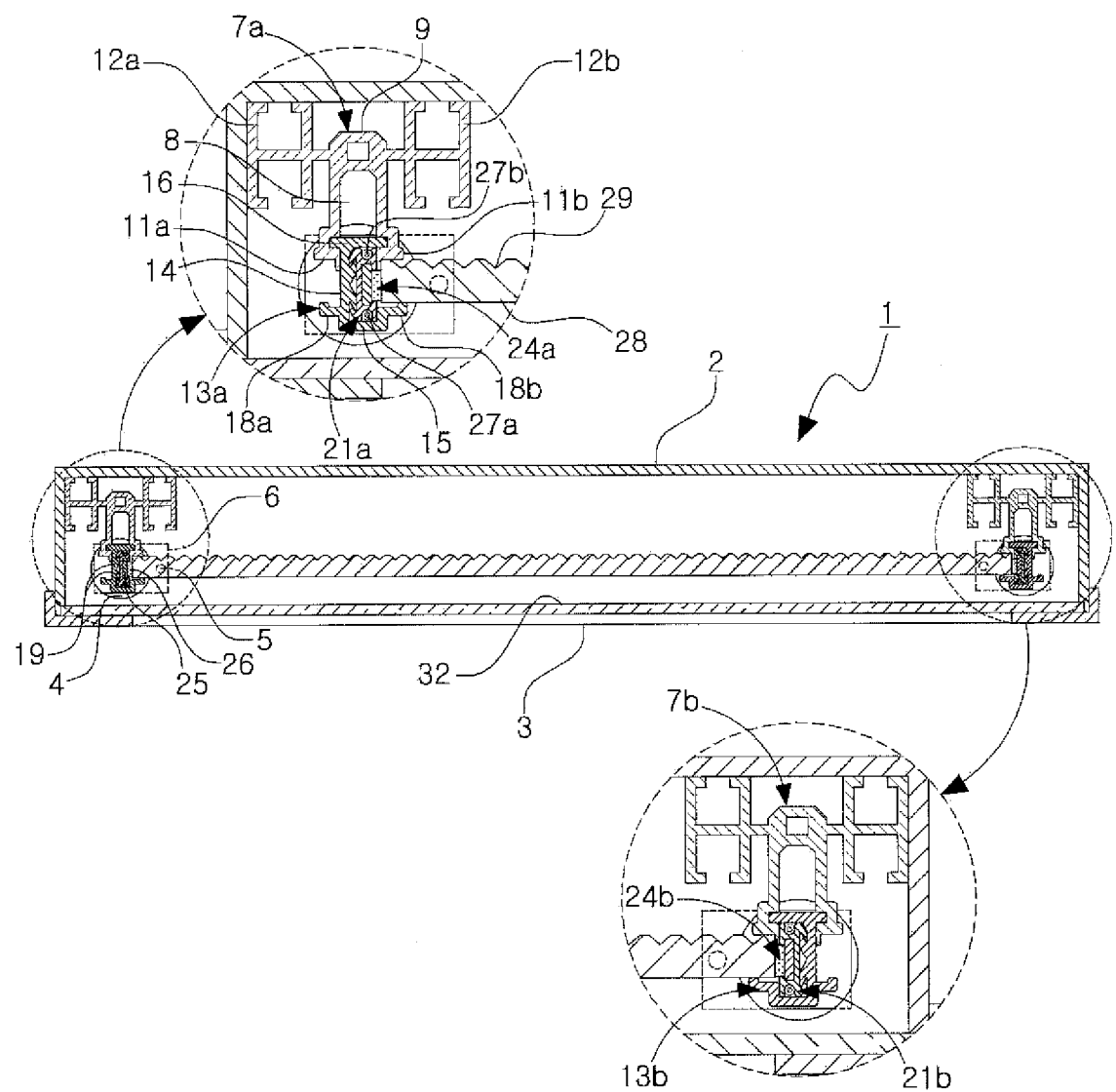
FIG. 6 is a sectional schematic view taken along line A-A' of FIG. 4.

Moreover, one or a plurality of detachable parts 4 is or are installed in a top surface or a bottom surface of the body casing 2. The detachable part 4, as shown in FIGS. 5 and 6, is disposed in a portion where the light guide plate stand 13a or 13b, the LED module mounting stand 21a or 21b, and the LED module 24a or 24b are assembled. Therefore, the light guide plate stand 13a or 13b, the LED module mounting stand 21a or 21b, and the LED module 24a or 24b can be attached or detached in an up-and-down direction through the detachable part 4, and thus, a replacement, a repair and a maintenance of the LED modules 24a and 24b can be easily performed.

As shown in FIGS. 1, 3, 5 and 6, to prevent rainwater from permeating to the inside of the body casing 2 to generate short circuit in case of rain, the detachable part 4 may be disposed in the bottom surface of the body casing 2. Also, an opening and closing door 6 rotating with respect to a rotation shaft 5 is installed in a portion in which the detachable part 4 is installed, and thus, the detachable part 4 can be opened or closed with the opening and closing door 6.

Moreover, the detachable part 4 may be opened or closed by a general cork (not shown) coupled to the detachable part 4 by using a method of securing a screw or a inserting and coupling method, instead of being opened or closed with the opening and closing door 6, as occasion demands.

The radiation stands 7a and 7b, as shown in FIGS. 1 to 3, 5 and 6, are vertically erected to be respectively assembled in a left side and a right side of the inside of the body casing 2, support the light guide plate stands 13a and 13b to be inserted to be coupled, and naturally radiate heat generated from the LED modules 24a and 24b to the outside. The radiation stands 7a and 7b respectively includes a radiation stand body 9 which has a length corresponding to a height of the inside surface of the body casing 2 and is formed in a long bar shape. A front cutting groove 8 is formed in an up-and-down and vertical direction in a front side of the radiation stand body 9. The light guide plate stands 13a and 13b are respectively inserted to be coupled to the front cutting groove 8 in an up-and-down and vertical direction. A front side and an up-and-down side of the front cutting groove 8 are open. Inserting grooves 10a and 10b facing each other are formed in an up-and-down and vertical direction in each of central portions of a left side surface and a right side surface of an inside of a portion in which the front cutting groove 8 is formed in the radiation stand body 9. A rear mounting bar 16 formed in a rear side of each of the light guide plate stands 13a and 13b is inserted between the inserting grooves 10a and 10b. Therefore, each of the light guide plate stands 13a and 13b can be detachably inserted to be coupled to the front cutting groove 8 of each of the radiation stands 7a and 7b.

Figure 3:
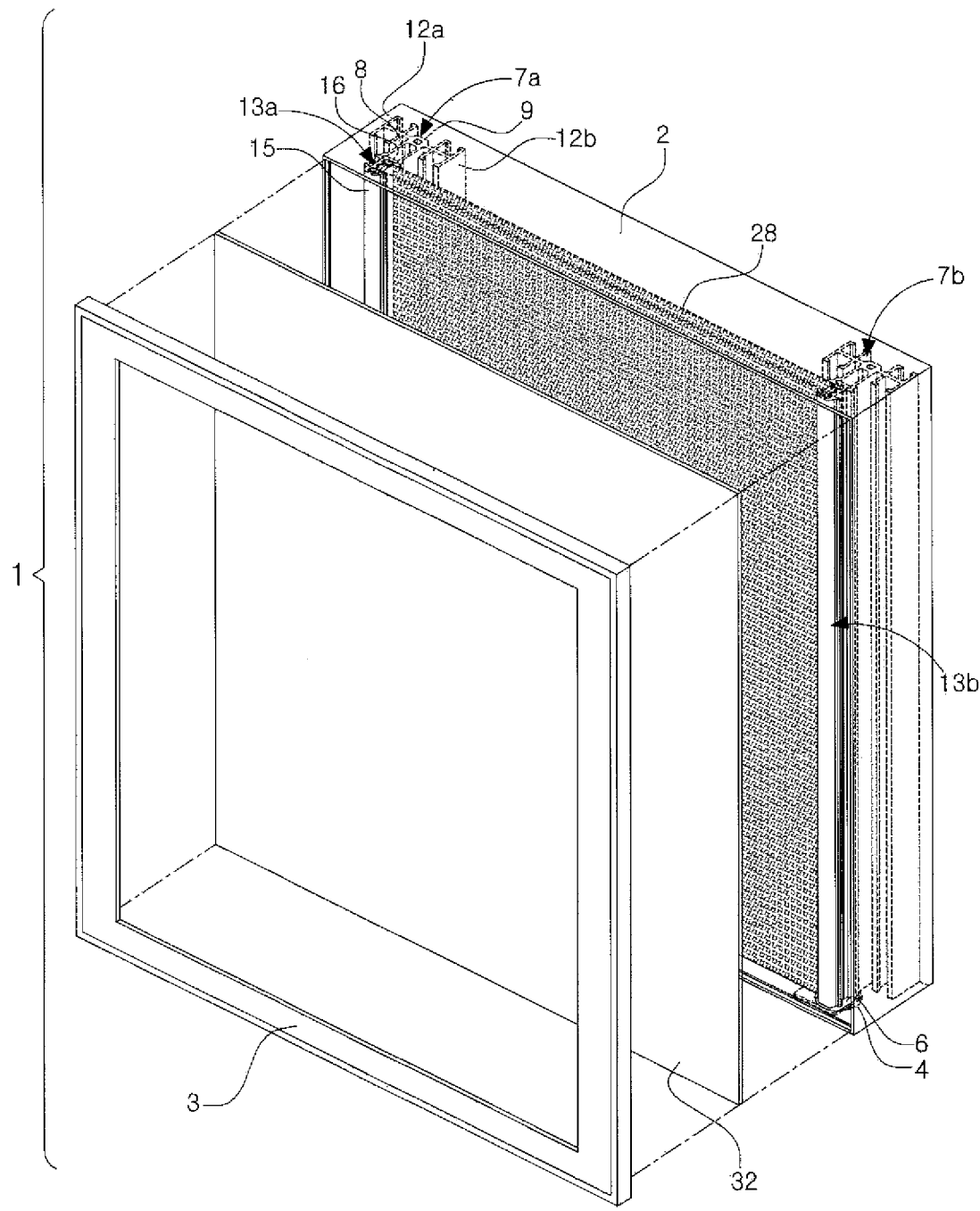
FIG. 3 is a perspective view schematically illustrating a state where a front plate and a front frame is mounted when a radiation stand, a light guide plate stand, a LED module mounting stand and a LED module are being assembled to be coupled inside a body casing of the detachable light emitting device according to the present invention.
Figure 4:
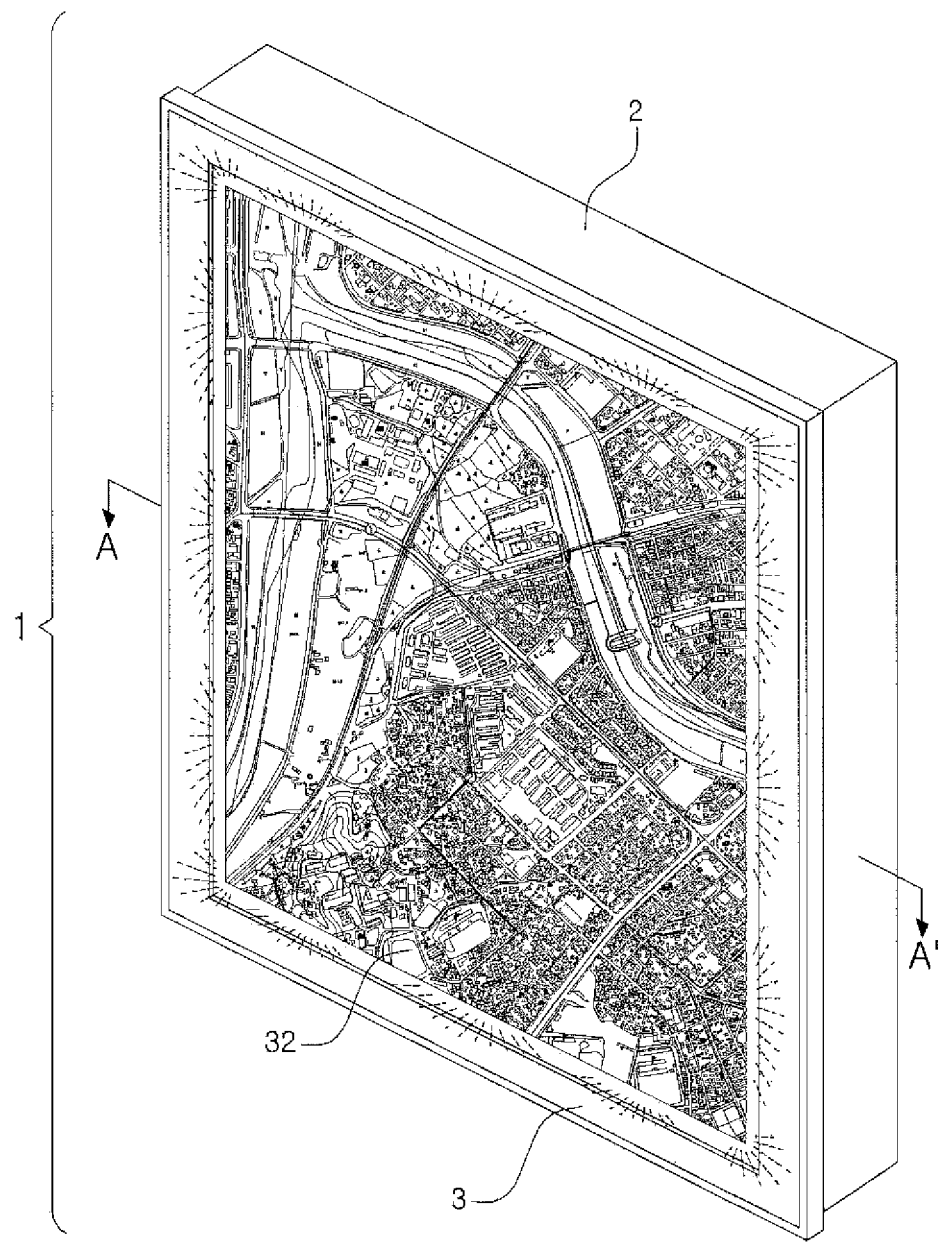
FIG. 4 is a perspective view schematically illustrating a assembling state of the detachable light emitting device according to the present invention.

Moreover, in the radiation stand body 9, front protrusions 11a and 11b respectively extending to an outside of a left side and a right side of a portion, in which the front cutting groove 8 is formed, respectively protrude in an up-and-down direction along the radiation stand body 9. Therefore, as shown in FIGS. 3 and 6, each of front end protrusions 18a and 18b of the light guide plate stands 13a and 13b is inserted to be coupled to the front cutting groove 8. Also, the light guide plate 28 is smoothly inserted between the front end protrusion 18a and 18b of the light guide plate stand and the front protrusion 11a and 11b to be tightly disposed.

Moreover, the radiation stand body 9 is formed of a metal material, such as an aluminum material, which has a high light-emitting efficiency. Radiation bars 12a and 12b are integrally formed to be fixed in each of a left side and right of a rear portion of the radiation stand body 9 in an up-and-down and vertical direction along the radiation stand body 9. Heat generated from the LED module 24a or 24b passes through the LED module mounting stand 21a or 21b and the light guide plate stand 13a or 13b wrapping the outside of the LED module 24a or 24b, and naturally radiates to the outside through the radiation stand body 9 of the radiation stand 7a or 7b and the radiation bar 12a or 12b. Therefore, the LED modules 24a and 24b can be prevented from being damaged and being transformed by heat.

A sectional surface of the radiation bars 12 and 12b, as shown in FIG. 6, is formed in a 'H' shape to increase natural light-emitting efficiency.

Each of the light guide plate stands 13a and 13b, as shown in FIGS. 1 to 3, 5 and 6, is vertically inserted to be detachably coupled to the front cutting groove 8 of each of the radiation stands 7a and 7b. Each of the LED module mounting stands 21a and 21b is vertically inserted to be coupled to the one side of each of the light guide plate stands 13a and 13b. Each of the light guide plate stands 13a and 13b supports the light guide plate 28 to be vertically erected to be disposed. Each of the light guide plate stands 13a and 13b is formed of a metal material, such as an aluminum material, which has a high light-emitting efficiency. Each of the light guide plate stands 13a and 13b includes a light guide plate stand body 14 which has a length corresponding to a length of each of the radiation stands 7a and 7b, is formed in a bar shape being long in an up-and-down direction, and is formed in a front-and-rear direction of each of the light guide plate stands 13a and 13b. A front mounting bar 15 and a rear mounting bar 16, which are respectively formed in a left-and-right and vertical direction, are respectively formed in a front side and a rear side of the light guide plate stand body 14. The front mounting bar 15 and the rear mounting bar 16 are formed along the light guide plate stand body 14 in an up-and-down and vertical direction and are integrally formed with the light guide plate body 14. Therefore, a side mounting groove 17 is formed in one side of each of the light guide plate stands 13a and 13b in an up-and-down and vertical direction, and thus, each of the LED module mounting stands 21a and 21b is smoothly inserted to be coupled to the side mounting groove 17.

Moreover, the rear mounting bar 16 is inserted between the inserting grooves 10a and 10b of the radiation stand body 9. Each of the light guide plate stands 13a and 13b is vertically inserted to be detachably coupled to the front cutting groove 8 of each of the radiation stands 7a and 7b. Front end protrusions 18a and 18b extending to an outside are respectively formed in a left side and a right side of the front mounting bar 15 to protrude along the front mounting bar 15 in an up-and-down direction. As shown in FIGS. 1, 3 and 6, the side surface of the light guide plate 28 is smoothly inserted between the front end protrusion 18a or 18b of the light guide plate stand 13a or 13b and the front protrusion 11a or 11b of the radiation stand 7a or 7b to be stably disposed when the LED module mounting stand 21a or 21b is inserted to be coupled to the inside of the side mounting groove 17 of the light guide plate stand 13a or 13b.

As shown in FIGS. 1, 3, 5 and 6, the side mounting groove 17 of the light guide plate stand 13a inserted to be coupled to the left radiation stand 7a is formed in a right side of the light guide plate stand 13a, and the side mounting groove 17 of the light guide plate stand 13b inserted to be coupled to the right radiation stand 7b is formed in a left side of the light guide plate stand 13b. Therefore, the side mounting groove 17 of the left light guide plate stand 13a faces the side mounting groove 17 of the right light guide plate stand 13b, and each of the LED module mounting stands 21a and 21b inserted to be coupled to each of the side mounting grooves 17 face each other, and thus, the LED modules 24a and 24b are respectively adjacent to each of the right side and the left side of the light guide plate 28 to be installed.

Figure 2:
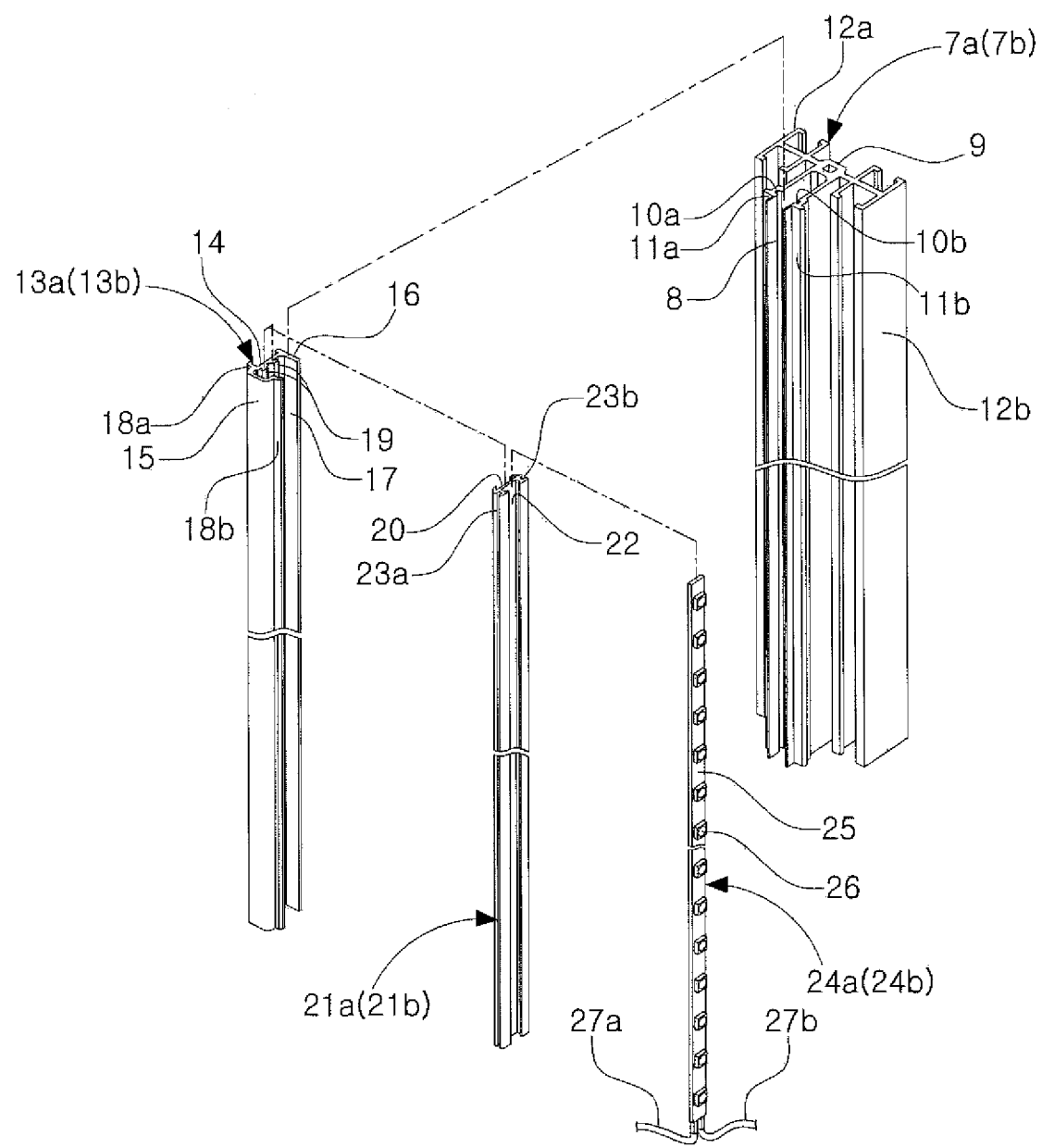
FIG. 2 is a perspective view schematically illustrating a state where a light guide plate stand, a LED module mounting stand and a LED module are sequentially inserted and coupled to a radiation stand in the detachable light emitting device according to the present invention.

As shown in FIGS. 2, 5 and 6, a guide rail 19 is formed in one side, in which the side mounting groove 17 is formed, along the light guide plate stand body 14 in an up-and-down and vertical direction. A guide recess 20 formed in other side of the LED module mounting stand 21a or 21b is guided to be coupled to the guide rail 19. Therefore, each of the LED module mounting stands 21a and 21b can be inserted in an up-and-down direction to be stably coupled to the side mounting groove 17 of each of the light guide plate stands 13a and 13b.

The LED module mounting stand 21a or 21b, as shown in FIGS. 1 to 3, 5 and 6, is inserted in an up-and-down direction to be detachably coupled to the side mounting groove 17 of the light guide plate stand 13a or 13b. The LED module 24a or 24b is inserted in an up-and-down direction to be coupled to the one side of the LED module mounting stand 21a or 21b. The LED modules 21a and 21b are formed of a metal material, such as an aluminum material, having a high light-emitting efficiency, have a length corresponding to a length of the light guide plate stands 13a and 13b, and are respectively formed in a bar shape being long in an up-and-down direction. Each of the LED module mounting stands 21a and 21b is inserted in an up-and-down direction to be detachably coupled to the side mounting groove 17 of each of the light guide plate stands 13a and 13b. The LED mounting groove 22 is formed in an up-and-down direction in one side of each of the LED module mounting stands 21a and 21b. One side and an upper portion and a lower portion of the LED mounting groove 22 are open. The LED module 24a or 24b is inserted in an up-and-down direction to be coupled to the LED module mounting stand 21a or 21b, and the LED 26 installed in one side of a printed circuit board 25 of the LED module 24a or 24b is disposed to face the outside through the open side of the LED mounting groove 22. Also, the side surface of the light guide plate 28 is disposed between the front end protrusion 28a or 28b of the light guide plate stand 13a or 13b and the front protrusion 11a or 11b of the radiation stand 7a or 7b. Therefore, the side surface of the light guide plate 28 closely contacts the LED 26 of the LED module 24a or 24b, and the state can be maintained.

Also, as shown in FIGS. 2, 5 and 6, the guide recess 20 is formed in a vertical direction in other side of each of the LED module stands 21a and 21b. Other side and an upper portion and a lower portion of the guide recess 20 are open. The guide recess 20 is inserted in an up-and-down direction to be coupled to the guide rail 19 formed in one side of the light guide plate stand body 14. As the guide recess 20 is guided to be coupled along the guide rail 19, the LED module mounting stand 21a or 21b is inserted to be stably coupled to the inside of the side mounting groove 17.

Also, as shown in FIG. 2, wire inserting grooves 23a and 23b are respectively formed in a central portion of a front side and a rear side of the LED module mounting stand 21a or 21b in an up-and-down and vertical direction. Wires 27a and 27b, as shown in FIG. 6, of the LED module 24a or 24b inserted to be coupled to the LED mounting groove 22 are respectively inserted into the wire inserting groove 23a or 23b. Therefore, when the LED module mounting stand 21a or 21b is attached or detached, the wires 27a and 27b are not hung.

As shown in FIGS. 1 to 3, 5 and 6, the LED module 24a or 24b is inserted in an up-and-down and vertical direction to be detachably coupled to the LED mounting groove 22 of the LED module mounting stand 21a or 21b, and emits light using the Light Emitting Diode LED 26 for the light guide plate 28 to output plane light. The LED module 24a or 24b includes a printed circuit board 25 which has a length corresponding to a length of the LED module mounting stand 21a or 21b and is formed in a bar shape being long in an up-and-down direction. Plurality of LEDs 26 connecting each other with a circuit is mounted on one side of the printed circuit board 25 at certain intervals. When the printed circuit board 25 is inserted into the LED mounting groove 22, the LED 26 of the printed circuit board 25 is exposed to the outside through the open one side of the LED mounting groove 22, and thus, the LED 26 closely contact the side of the light guide plate 28. Therefore, the light guide plate 28 outputs plane light using light emitted from the LED 26.

Moreover, in the LED module 24a or 24b, wires 27a and 27b for supplying power are connected to one end of the printed circuit board 25. An general outside power lines connect to the ends of the wires 27a and 27b when each of the wires 27a and 27b is being inserted into each of the wire inserting groove 23a and 23b of the LED module mounting stand 21a or 21b, and thus, power is supplied to the LED modules 24a and 24b.

The LED 26 is generally formed in a mold type of light emitting diode LED or formed in a surface mount devices light emitting diode SMD LED. Because the light guide plate 28 vertically erected outputs light with the LED modules 24a and 24b each of which is formed in a thin and long bar shape, a total width of the light emitting device 1 can be slim, and thus, an installation of the light emitting device 1 can be easily performed.

As shown in FIGS. 1, 3 and 6, the light guide plate 28 is formed of a material, such as a transparent plastic, a glass, or the like, and is a plate formed in a rectangular shape. The light guide plate 28 is inserted between the right and left light guide plate stands 13a and 13b to be vertically disposed when each of the LED module mounting stands 21a and 21b and each of the LED modules 24a and 24b are sequentially inserted to be coupled to the each of the light guide plate stands 13a and 13b. The LED 26 of each of the LED modules 24a and 24b are disposed to be adjacent to the right side and the left side of the light guide plate 28, and the light guide plate 28 outputs plane light using light emitted from the LED 26. A width of the light guide plate 28 is formed to correspond to a gap between the radiation stands 7a and 7b each of which is assembled to be installed in the inside of the body casing 2 at certain intervals. A left side surface and a right side surface of the light guide plate 28 are respectively inserted between each of the front protrusion 11a and 11b and each of the front end protrusion 18a and 18b to be stably disposed. Here, each of the front protrusions 11a and 11b respectively extends and protrudes to an outside in a left side and a right side of a front side of the radiation stand body 9 of each of the radiation stands 7a and 7b, and each of the front end protrusion 18a and 18b respectively extends and protrudes to an outside in a left side and a right side of the front mounting bar 15 of each of the light guide plate stands 13a and 13b. Therefore, because the state where the each of the right surface and the left surface of the light guide plate 28 closely contacts the LEDs 26 of the LED modules 24a and 24b each of which is inserted to be coupled to the inside of each of the LED module mounting stands 21a and 21b is maintained, the light-emitting efficiency can be increased.

Moreover, the width of the light guide plate 28 is equal to or greater than a width of the LED 26 of the LED modules 24a and 24b, and thus, most of the light emitted from the LEDs 26 can be inputted to the inside of the light guide plate 28. A plurality of irradiating line 29 formed in a horizontal and vertical direction are formed in the rear surface of the light guide plate 28, and the irradiating line 29 is formed by cutting the light guide plate 28. The light emitted from the LEDs 26 of the LED modules 24a and 24b moves along the irradiating line 29, and the light is refracted and reflected to the front side of the light guide plate 28 inside the light guide plate 28, and thus, the whole of the front surface of the light guide plate 28 uniformly outputs the plane light.

The irradiating lines 29 are densely formed in a whole of the rear surface of the light guide plate 28 at certain intervals, and as shown in FIG. 6, the sectional surface is formed in a 'V' shape formed by cutting the surface of the light guide plate 28. The light emitted from LEDs 26 of the LED modules 24a and 24 to go straight contacts the V-shaped irradiating line 29 formed with a cutting method to be refracted and reflected to the front surface of the light guide plate 28, and then, spreads to the whole of the front surface of the light guide plate 28, and therefore, the light guide plate outputs the plane light.

Moreover, as occasion demands, a gap between the irradiating lines 29 may progressively narrows toward a upper portion, a lower portion or a central portion of the light guide plate 28 such that the light emitted from the LED 26 disposed in a position adjacent to the right side and left side of the light guide plate 28 can be concentrated to the upper portion, the lower portion or the central portion which are far from the LED 26, and thus, the whole of the light guide plate 28 can uniformly outputs the plane light.

Figure 7:
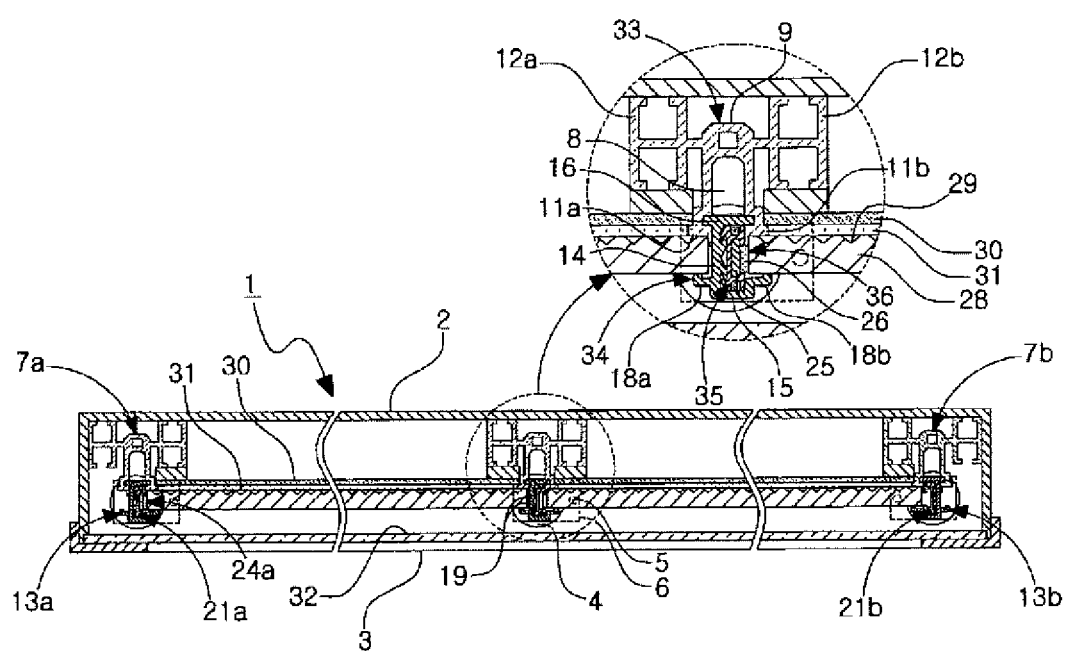
FIG. 7 is a sectional view schematically illustrating a state where one or a plurality of middle radiation stands is or are disposed in a middle portion of the inside of a body casing, and a middle light guide plate stand, a middle LED module mounting stand and a middle LED module are assembled to be installed in each of the middle radiation stands in a detachable light emitting device according to another embodiment of the present invention.

As shown in FIG. 7, a rear plate 30 closely contacts a rear portion of the light guide plate 28 to be installed such that light outputted from the light guide plate 28 go to the front side of the light guide plate 28. The rear plate 30 is formed in a rectangular-plate shape corresponding to the light guide plate 28. The front portion of the rear plate 30 closely contacts the light guide plate 28, and both end portions of a right side and a left side of a rear portion of the rear plate 30 are supported by a radiation bars 12a and 12b of the radiation stands 7a and 7b to be vertically erected to be maintained. A general reflective film 31 may be disposed to be attached in the front surface of the rear plate 30, or may be integrally formed with the rear plate 30, and thus, reflects light outputted to the rear portion of the light guide plate 28 to the front surface to increase light-emitting efficiency of the front surface of the light guide plate 28.

As shown in FIGS. 1, 3, 4, and 6, the front plate 32, on which various characters, drawings, photos or the like are printed, is vertically erected, and a size of the front plate 32 corresponds to a size of the front side of the inside of the body casing 2. The front plate 32 is detachably installed in a front side of the inside of the body casing 2 with a front frame 3 of the body casing 2, and is separated from the front side of the light guide plate 28 at certain intervals. Therefore, the various characters, drawings, photos or the like can be easily recognized with the light guide plate 28 outputting the light in the front surface a day and night.

In another embodiment according to the present invention, as show in FIG. 7, one or a plurality of middle radiation stands 33 are assembled to be installed in a central portion of the inside of the body casing 2, and a middle light guide plate stand 34, a middle LED module mounting stand 35 and a middle LED module 36 are assembled to be installed in the middle radiation stand 33. A plurality of light guide plates 28 are disposed in a row to be parallel to each other between the right and left light guide plate stands 13a and 13b, and the one middle light guide plate stand or the middle light guide plate stands 34. The one or a plurality of middle radiation stands 33, the middle light guide plate stand 34, the middle LED module mounting stand 35, and the middle LED module 36 have shapes and structures respectively same as shapes and structures of the radiation stands 7a and 7b, the light guide plate stands 13a and 13b, the LED module mounting stands 21a and 21b, and the LED modules 24a and 24b respectively disposed in the right side and the left side. The left side surface of the light guide plate 28 disposed in the left side is inserted between the front protrusion 11b protruding in the right side of the radiation stand 7a disposed in the left side and the front end protrusion 18b protruding in the right side of the light guide plate stands 13a, and the right side surface of the light guide plate 28 disposed in the left side is inserted between the front protrusion 11a protruding in the left side of the middle radiation stand 33 and the front end protrusion 18a protruding in the left side of the middle light guide plate stand 34 to be vertically erected. Therefore, the left side surface of the light guide plate 28 disposed in the left side closely contacts the LED module 24a inserted to be coupled to the left LED module mounting stand 21a to be adjacent to the LED modules 24a, and thus, the light guide plate 28 disposed in the left side outputs the plane light emitted from the LED 26 of the LED module 24a.

Also, the right side surface of the light guide plate 28 disposed in the right side is inserted between the front protrusion 11a protruding in the left side of the radiation stand 7b disposed in the right side and the front end protrusion 18a protruding in the left side of the light guide plate 13b, and the left side surface of the light guide plate 28 disposed in the right side is inserted between the front protrusion 11b protruding in the right side of the middle radiation stand 33 and the front end protrusion 18b protruding in the right side of the middle light guide plate stand 34 to be vertically erected. Therefore, the right side surface of the light guide plate 28 disposed in the right side closely contacts the middle LED module 36 inserted to be coupled to the middle LED module mounting stand 35 to be adjacent to the middle LED modules 36, and thus, the light guide plate 28 disposed in the right side outputs the plane light emitted from the LED 26 of the middle LED module 36. At this point, to maintain a uniform brightness, the LED module 24b is not installed in the right LED module mounting stand 21b, and thus, each of the light guide plates 28 can output plane light having the uniform brightness.

Moreover, in the body casing 2, each of one or a plurality of detachable parts 4 is installed in a lower portion of a position in which the middle Light guide plate stand 34, the middle LED module mounting stand 35 and the LED module 36 are sequentially assembled to be installed to one or a plurality of middle radiation stands 33, and an opening and closing door 6 rotating with respect to a rotation shaft 5 is installed in the detachable part 4. Therefore, the detachable part 4 is opened or closed with the opening and closing door 6, and thus, a replacement and a repair of the middle LED module 36 can be easily performed through the detachable part 4.

Figure 8:
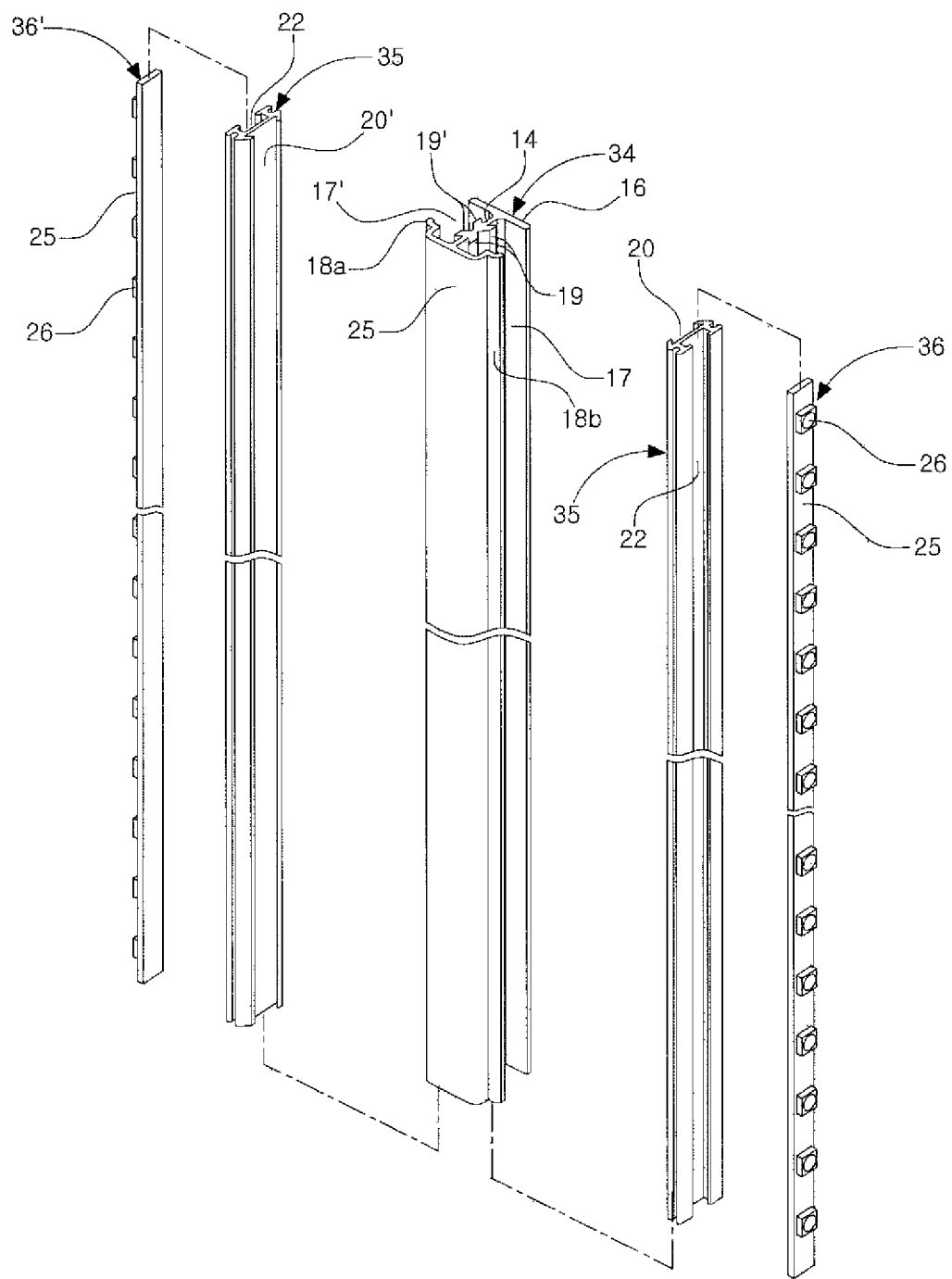
FIG. 8 is a exploded perspective view schematically illustrating another embodiment of a middle light guide plate stand applied to the present invention.
Figure 9:
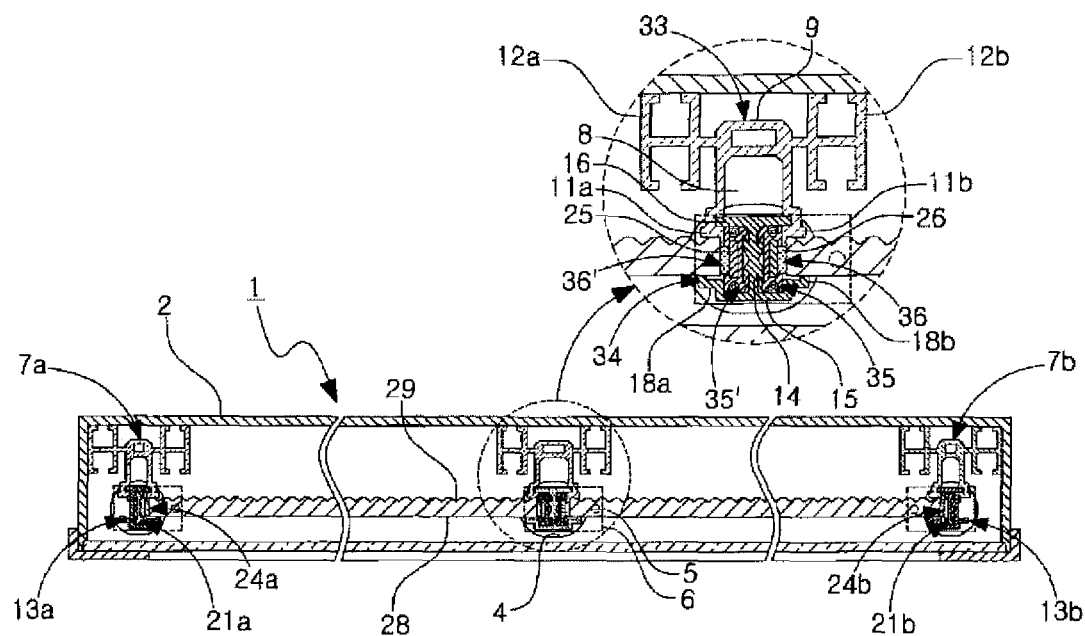
FIG. 9 is a sectional view schematically illustrating a state where another embodiment of a middle light guide palate stand applied to the present invention is being installed.

Also, in the other embodiment according to the present invention, as shown in FIGS. 8 and 9, the middle light guide plate stand 34 inserted to be coupled to the middle radiation stand 33 includes a light guide plate stand body 14 which has a length corresponding to a length of the middle radiation stand 33, is formed in a bar shape being long in an up-and-down direction, and is formed in a front-and-rear direction. A front mounting bar 15 and a rear mounting bar 16, which are respectively formed in a front side and a rear side of the light guide plate stand body 14 and are respectively formed in a left-and-right and horizontal direction, are integrally fixed in an up-and-down and vertical direction to be attached along the light guide plate stand body 14. Side mounting grooves 17 and 17' are respectively formed in one side and other side of the middle light guide plate stands 34 in an up-and-down and vertical direction. Each of the middle LED module mounting stands 35 and 35' is inserted to be coupled to each of the side mounting grooves 17 and 17', and thus, the middle LED module mounting stands 35 and 35' are respectively assembled to be installed both sides of the middle light guide plate stand 34. Each of middle LED modules 36 and 36' is inserted to be coupled to each of the middle LED module mounting stands 35 and 35'. The LEDs 26 of the left and right LED modules 24a and 24b and LEDs 26 of the middle LED modules 36 and 36' closely contact the right side surface and the left side surface of the light guide plates 28 to be installed to be adjacent to the right side surface and the left side surface of the light guide plates 28. Here, the light guide plates 28 are disposed between the left and right light guide plates 13a and 13b and one or a plurality of middle light guide plate stands 34 in a row to be parallel to each other, and thus each of the light guide plates outputs plane light.

Moreover, the rear mounting bar 16 is inserted in an up-and-down and vertical direction to be detachably coupled to the front cutting groove 8 of the middle radiation stand 33. Front end protrusions 18a and 18b extending to an outside are respectively formed in a left side and a right side of the front mounting bar 15 to protrude along the front mounting bar 15 in an up-and-down direction. The side surface of the light guide plate 28 is smoothly inserted between the front end protrusion 18a or 18b of the middle light guide plate stand 34 and the front protrusion 11a or 11b of the middle radiation stand 33 to be stably disposed when each of the middle LED module mounting stands 35 and 35' is being respectively inserted to be coupled to the inside of the side mounting groove 17 and 17' of the middle light guide plate stand 34.

Moreover, in the middle light guide plate stand 34, as shown in FIGS. 8 and 9, in the light guide plate stand body 14, guide rails 19 and 19' are respectively formed in one side and other side, in which the side mounting grooves 17 and 17' are respectively formed, along the light guide plate stand body 14 in an up-and-down and vertical direction. Guide recess 20 or 20' formed in other side of the middle LED module mounting stand 35 or 35' is guided to be coupled to the guide rail 19 or 19'. Therefore, each of the middle LED module mounting stands 35 and 35' can be inserted in an up-and-down direction to be stably coupled to each of the side mounting grooves 17 and 17' respectively formed in both sides of the middle light guide plate stand 34.

Hereinafter, the operation of the present invention will be described.

When it is required to assemble and install the detachable light emitting device 1 according to the present invention to make the front plate 32, in which various letters, drawings, figures, photos, or the like, light such that it is easy to recognize the letters, drawings, figures, photos, or the like a day and night, first, as shown in FIGS. 1 and 2, each of the radiation stands 7a and 7b is vertically erected to be coupled to be fixed to the left side and the right side of the rear portion of the inside of the body casing 2, and then, each of the Light guide plate stands 13a and 13b are inserted in a vertical direction to be coupled to the front cutting groove 8, which is formed in an up-and-down and vertical direction in the front side of the radiation stand body 9 of each of the radiation stands 7a and 7b. Then, the rear mounting bar 16 formed in a rear portion of the light guide plate stand body 14 of the light guide plate stand 13a or 13b is inserted to be coupled to the inserting grooves 10a and 10b respectively formed in the left side and the right side of the inside of the portion, in which the front cutting groove 8 is formed in the radiation stand body 9 such that the state where the light guide plate stand 13a or 13b is stably assembled to be coupled to the radiation stand 7a or 7b can be maintained.

Moreover, as shown in FIGS. 1, 3, 5 and 6, the side mounting groove 17 of the light guide plate stand 13a inserted to be coupled to the left radiation stand 7a faces the right side, and the side mounting groove 17 of the light guide plate stand 13b inserted to be coupled to the right radiation stand 7b faces the left side, and thus, the side mounting grooves 17 of the left and right light guide plate stands 13a and 13b face each other, and the LED module stands 21a and 21b inserted in an up-and-down and vertical direction to be coupled to each of the side mounting grooves 17 face each other. The guide recess 20 formed in other side of the LED module stand 21a or 21b is guided to be coupled to the guide rail 19 formed in an up-and-down and vertical direction in one side of the light guide plate stand body 14. The LED module mounting stand 21a or 21b is inserted to be stably coupled to the inside of the side mounting groove 17 of the light guide plate stand 13a or 13b, and the LED module 24a or 24b is inserted in an up-and-down and vertical direction to be coupled to the LED mounting groove 22 formed in one side of the LED module mounting stand 21a or 21b. Therefore, the LED 26 installed in one side surface of the printed circuit board 25 of the LED module 24a or 24b is disposed to face the outside through the open one side of the LED mounting groove 22. The side surface of the light guide plate 28 is inserted between the front end protrusion 18a or 18b of the light guide plate stand 13a or 13b and the front protrusion 11a or 11b of the radiation stand 7a or 7b to be disposed. At this point, each of the both side surfaces of the light guide plate 28 closely contacts to the LEDs 26 of the LED module 24a and 24b to be adjacent to the LEDs 26. The light emitted from the LEDs 26 of the LED modules 24a and 24b is inputted to the inside of the light guide plate 28, moves along the irradiating lines 29 formed in a horizontal and vertical direction in the rear surface of the light guide plate 28, and is refracted and reflected to the front side of the light guide plate 28, and thus, the whole of the front surface of the light guide plate 28 uniformly outputs the plane light.

Next, as shown in FIGS. 1, 3, 4 and 6, the front plate 32 having a size corresponding to a size of the front side of the inside of the body casing 2 is vertically erected to be disposed in the front side of the inside of the body casing 2, the front frame 3 is assembled to be installed in the front surface of the body casing 2, and thus, the front plate 32 is fixed to be installed in the front side of the light guide plate 28. Therefore, various advertising copies, drawings, photos, or the like printed in the front plate 32 output light with the light guide plate 28 outputting the plane light, and thus, can be easily recognized. Therefore, visibility can be increased.

When a replacement and a repair of the LED 26 is required because the LED modules 24a and 24b are used for long times and be damaged or broken, as shown in FIG. 5, the LED module stand 21a or 21b, to which the LED module 24a or 24b is inserted to be coupled, is separated through the detachable part 4 formed in an upper portion or a lower portion of a portion, in which the light guide plate 13a or 13b, the LED module stand 21a or 21b and the LED module 24a or 24b are assembled to be installed, in the body casing 2, and then, the LED module 24a or 24b is replaced.

INDUSTRIAL APPLICABILITY

The detachable light emitting device using light emitting diode modules according to the present invention can be widely applied to a route guide board in a bus station or the like, and an advertising panel in an airport, a subway or the like, and can output light from the front plate, in which various advertising copies, drawings, figures, photos or the like are printed, to increase visibility a day and night. Also, because the LED module can be inserted to be assembled when the LED module formed in a bar shape is closely contacting the one side or both side of the light guide plate outputting plane light, it is easy to attach or detach the LED module, and thus, a replacement, a repair and a management can be easily performed. Therefore, the detachable light emitting device can be applied to the various LED advertising panel, a guide panel or the like to be widely and usefully used.

The invention claimed is:

1. A detachable light emitting device having light emitting diode modules, the detachable light emitting device comprising:
   a body casing, light guide plate stands, light emitting diode (LED) modules;
   a light guide plate being vertically disposed between a left light guide plate stand and a right light guide plate stand to output plane light with LEDs, wherein
   the body casing a vacant inside includes a vertical open front surface and a front frame which is mounted on a front side of the body casing, wherein a detachable part is formed at an upper side or a lower side of the body casing;
   radiation stands vertically disposed at both sides of inside of the body casing, the radiation stands respectively including a front cutting groove vertically formed in a front side of the radiation stands, wherein the light guide plate stands are respectively inserted into and coupled in front cutting grooves of each of the radiation stands, and including side mounting grooves formed at each of the light guide plate stands;
   LED module mounting stands respectively inserted into and coupled in the side mounting groove of each of the light guide plate stands, and respectively including an LED mounting groove formed in a vertical direction at each side of the LED module mounting stands, wherein the LED modules having a printed circuit board which is coupled in the LED mounting groove of each of the LED module mounting stands; and
   a front plate installed at the inside of the body casing to output light transferred from the light guide plate, wherein the detachable part is disposed where the light guide stands, the LED module mounting stands, and the LED modules that are assembled, and wherein
   the light guide plate stands, the LED module mounting stands, and the LED modules are respectively and detachably installed in vertical direction through the detachable part.

2. The detachable light emitting device of claim 1, wherein an opening and closing door are formed with respect to a rotation shaft which is installed in a portion in which the detachable part is installed in the body casing, and the detachable part is opened or closed associated with the opening and closing door.

3. The detachable light emitting device of claim 1, wherein the detachable part is opened or closed with a cork coupled to the detachable part.

4. The detachable light emitting device of claim 1, wherein
   the radiation stands formed in a bar shape include a radiation stand body having a length corresponding to a height of the inside surface of the body casing, a front cutting groove is formed in a vertical direction at a front side of the radiation stand body, and
   the light guide plate stands are respectively inserted to be coupled to the front cutting groove, a front and an upper and a down side of the front cutting groove being opened, and
   grooves inserted facing each other, are formed in a vertical direction in each of central portions of a left side surface and a right side surface in which the front cutting groove is formed in the radiation stand body, and
   a rear mounting bar, formed at a rear side of each of the light guide plate stands, is inserted between the inserting grooves, and front protrusions which are respectively extending to an outside of a left side and a right side of a portion in which the front cutting groove is formed in a vertical direction along the radiation stand body, and wherein
   radiation bars are integrally formed to be fixed in each of a left side and right of a rear portion of the radiation stand body in a vertical direction along the radiation stand body.

5. The detachable light emitting device of claim 1, wherein each of the light guide plate stands includes a light guide plate stand body having a length corresponding to a length of each of the radiation stands, formed in a bar shape in a front-and-rear direction, a front mounting bar and a rear mounting bar are respectively formed in a left-and-right and horizontal direction and in a front side and a rear side of the light guide plate stand body, and
   the front mounting bar and the rear mounting bar are formed along the light guide plate stand body in a vertical direction and are integrally formed with the light guide plate body, and wherein
   a side mounting groove is formed in one side of each of the light guide plate stands in a vertical direction, and each of the LED module mounting stands is inserted to be coupled to the side mounting groove.

6. The detachable light emitting device of claim 5, wherein front end protrusions extending to an outside are respectively formed in a left side and a right side of the front mounting bar and protruding along the front mounting bar in a vertical direction, and
   a side surface of the light guide plate is inserted between the front end protrusion of the light guide plate stand and the front protrusion of the radiation stand when the LED module mounting stand is coupled to the inside of the side mounting groove of the light guide plate stand, the front protrusion extending and protruding in a left side or right side of the front side of the radiation stand body.

7. The detachable light emitting device of claim 1, wherein a side mounting groove of the light guide plate stand is coupled to the left radiation stand that is formed in a right side of the light guide plate stand, and the side mounting groove of the light guide plate stand is coupled to the right radiation stand that is formed in a left side of the light guide plate stand,
   the side mounting groove of the left light guide plate stand facing the side mounting groove of the right light guide plate stand, and
   each of the LED module mounting stands is coupled to each of the side mounting grooves facing each other, such that the LED modules are disposed adjacent to each of the right side and the left side of the light guide plate.

8. The detachable light emitting device of claim 5, wherein a guide rail is formed in one side in which the side mounting groove is formed along the light guide plate stand body in a vertical direction,
   a guide recess formed in other side of the LED module mounting stands is coupled to the guide rail, and
   each of the LED module mounting stands is inserted in a vertical direction to be stably coupled to the side mounting groove of each of the light guide plate stands.

9. The detachable light emitting device of claim 1, wherein the LED module mounting stands formed in a bar shape having a length corresponding to a length of the light guide plate stands,
   open portions formed at one side of an upper portion and a lower portion of the LED mounting groove, and the LED modules are inserted in a vertical direction to be coupled through the open portion,
   the LED installed in one side of a printed circuit board of the LED module is disposed facing the outside through one of the open portions, the side surface of the light guide plate closely contacts the LED of the LED modules, and wherein
   a guide recess is formed in a vertical direction in other side of each of the LED module mounting stands, and an upper portion and a lower portion of the guide recess being opened, and the guide recess being inserted in a vertical direction to be coupled to the guide rail formed in one side of the light guide plate stand body of the light guide plate.

10. The detachable light emitting device of claim 1, wherein wire inserting grooves are respectively formed in a central portion of a front side and a rear side of the LED module mounting stands in a vertical direction, and wires of the LED modules are coupled to the LED mounting groove and are respectively inserted into the wire inserting groove.

11. The detachable light emitting device of claim 1, wherein, the light guide plate is a plate formed in a rectangular shape,
   a width of the light guide plate is equal to or greater than a width of the LED of the LED modules, and a plurality of irradiating lines are formed in a horizontal and vertical direction in the rear surface of the light guide plate, and the irradiating line is formed by cutting the light guide plate, and
   the whole portion of the front surface of the light guide plate outputs the plane light, a sectional surface of the irradiating line is formed in a 'V' shape, and a gap between the irradiating lines progressively narrows toward an upper portion, a lower portion or a central portion of the light guide plate such that the light emitted from the LED of the LED modules disposed in a position adjacent to the right side and left side of the light guide plate is concentrated to the upper portion, the lower portion or the central portion which are apart from the LED, and wherein
   the whole of the light guide plate uniformly outputs the plane light.

12. The detachable light emitting device of claim 1, wherein a rear plate closely contacts a rear portion of the light guide plate such that light outputted from the light guide plate go to the front side of the light guide plate, and the rear plate is formed in a rectangular-plate shape corresponding to the light guide plate, a front portion of the rear plate contacts the light guide plate, and both end portions of a right side and a left side of a rear portion of the rear plate are supported by a radiation bars of the radiation stands to be vertically maintained, and a general reflective film is disposed to be attached in the front surface of the rear plate, or is integrally formed with the rear plate.

13. The detachable light emitting device of claim 1, wherein at least one of a plurality of middle radiation stands are assembled to be installed in a central portion of the inside of the body casing, and wherein
   a middle light guide plate stand, a middle LED module mounting stand and a middle LED module are assembled to be installed in the middle radiation stand, and a plurality of light guide plates are disposed in a row to be parallel to each other between the right and left light guide plate stands, and at least one of the middle light guide plate stand or the middle light guide plate stands, and at least one of the middle radiation stands, the middle light guide plate stand, the middle LED module mounting stand, and the middle LED module have shapes and structures respectively same as shapes and structures of the radiation stands, the light guide plate stands, the LED module mounting stands, and the LED modules.

14. The detachable light emitting device, wherein in the body casing, at least one of a plurality of detachable parts is installed in a lower portion of a position in which the middle light guide plate stand, the middle LED module mounting stand and the middle LED module are sequentially assembled to be installed to at least one of a plurality of middle radiation stands, an opening and closing door rotating with respect to a rotation shaft is installed in the detachable part, the detachable part is opened or closed with the opening and closing door, and wherein
   a replacement and a repair of the middle LED module is easily performed through the detachable part.

15. The detachable light emitting device of claim 13, wherein, the middle light guide plate stand includes a light guide plate stand body formed in a bar shape and having a length corresponding to a length of the middle radiation stand, and formed in a front-and-rear direction, and wherein
   a front mounting bar and a rear mounting bar are respectively formed in a front side and a rear side of the light guide plate stand body and are respectively formed in a left-and-right and horizontal direction, and are integrally fixed in a vertical direction to be attached along the light guide plate stand body,
   side mounting grooves are respectively formed in one side and other side of the middle light guide plate stand in a vertical direction, each of the middle LED module mounting stands is inserted to be coupled to each of the side mounting grooves, wherein,
   the middle LED module mounting stands are respectively assembled to be installed both sides of the middle light guide plate stand, each of the middle LED modules is inserted to be coupled to each of the middle LED module mounting stands, wherein
   the LEDs of the left and right LED modules and the middle LED modules closely contact the right side surface and the left side surface of the light guide plates to be installed adjacent to the right side surface and the left side surface of the light guide plates, and the light guide plates are disposed between the left and right light guide plate stands and at least one of a plurality of middle light guide plate stands in a row to be parallel to each other, such that each of the light guide plates outputs plane light.

16. The detachable light emitting device of claim 15, wherein the rear mounting bar is inserted in a vertical direction to be detachably coupled to the front cutting groove of the middle radiation stand 33, front end protrusions extending to an outside are respectively formed in a left side and a right side of the front mounting bar and protruding along the front mounting bar in a vertical direction, and wherein the side surface of the light guide plate is inserted between the front end protrusion of the middle light guide plate stand and the front protrusion of the middle radiation stand to be disposed when each of the middle LED module mounting stands is respectively inserted to the inside of the side mounting groove of the middle light guide plate stand 34, and guide rails are respectively formed in one side and other side in which the side mounting grooves are respectively formed along the light guide plate stand body in a vertical direction, in the middle light guide plate stand, guide recess formed in other side of the middle LED module mounting stand is guided to be coupled to the guide rail, and each of the middle LED module mounting stands is inserted in a vertical direction to be coupled to each of the side mounting grooves which are respectively formed in both sides of the middle light guide plate stand.

* * * * *